Oct. 28, 1969

Inventors
Merle R. Swinehart
Walther Richter
By Wm. A. Autio
Attorney

United States Patent Office 3,475,677
Patented Oct. 28, 1969

3,475,677
**CONDITION RESPONSIVE PROPORTIONAL
CONTROL SYSTEMS**
Merle R. Swinehart, Brookfield, and Walther Richter,
River Hills, Wis., assignors to Cutler-Hammer, Inc.,
Milwaukee, Wis., a corporation of Delaware
Filed July 31, 1967, Ser. No. 657,138
Int. Cl. G05f 1/40, 1/60; H02p 13/14
U.S. Cl. 323—21                                    8 Claims

ABSTRACT OF THE DISCLOSURE

A condition responsive proportional control system for an air conditioner which reduces the fan speed from a maximum such as 1400 r.p.m. to a minimum such as 600 r.p.m. as the room temperature drops as little as ten degrees from 70 to 60 degrees F. or less. A thermistor senses the temperature and unbalances a resistance bridge circuit which controls a transistor circuit to leak off current from the smaller one of a pair of series capacitors in the trigger control circuit of a solid state gating type power control element connected in the fan motor circuit.

BACKGROUND OF THE INVENTION

This invention relates to automatic proportional control of electrical load devices in response to some variable condition which is sensed. More specifically, the invention relates to proportional control of the energization of an alternating current load device as a function of a variable external condition wherein such condition is sensed to a substantial degree of sensitivity by a variable resistor sensor such as a thermistor, photo cell, humidity cell or the like connected to unbalance a bridge circuit. For example, the proportional control system may be applied to control and adjust a load device of the type requiring a substantial change in response to a small variation in the condition. For this purpose, the system may be applied to adjust the speed of an air conditioner fan in response to temperature change, to adjust the energization of an electric heater in response to temperature change, to adjust the energization of a lamp in response to change from daylight to darkness, to adjust a humidifier or dehumidifier in response to detection of change in the humidity level of the surrounding air, etc.

The state of the prior art in this field is such that proportional control for some applications has been known depending upon the magnitude of the input signal or variable condition that is available. For example, there has been disclosed in M. R. Swinehart copending patent application Ser. No. 657,137, filed July 31, 1967, a basic circuit providing proportional control with a great degree of control and stability.

Proportional control of the speed of a furnace blower motor in response to change in temperature of the air in the furnace bonnet is known; however, a large change in temperature such as occurs in the furnace bonnet is required to obtain a sufficient blower speed change.

A manually controllable system wherein a bidirectional semiconductor gating type power control element or so-called "Quadrac" or "Triac" is used to adjust the electrical energy supplied to a load device is well known. In such system, a control device such as a trigger diode or so-called "Trigger" or "Diac" is connected in the gate circuit of the "Quadrac." An RC circuit is connected across the main terminals of the "Quadrac" with the junction between the manually adjustable resistor and capacitor thereof being connected through the "Diac" to the gate of the "Quadrac."

SUMMARY OF THE INVENTION

The present invention relates to improvements on the basic circuit of the aforementioned copending patent application affording a greater degree of sensitivity and adjustability and which also facilitates reversing the direction of output control in response to a given input variation with only a minor modification of the circuit and facilitates compensation and setting of the minimum output control.

To obtain an automatic system for air conditioner fan speed control, for example, one would normally think of replacing the adjustable resistor in the aforementioned RC circuit with a negative temperature coefficient thermistor adding a positive temperature coefficient thermistor across the capacitor in the RC circuit. However, the resultant system does not provide sufficient sensitivity to afford the desired speed control range over a ten degree F. or smaller change in temperature as is desirable in some applications.

Replacing the manually adjustable resistor in the RC circuit with a thermistor controlled bridge circuit provides satisfactory sensitivity but has certain other disadvantages. The components in such bridge circuit would not withstand the voltage occurring across the "Quadrac" so that Zener diodes would have to be connected across the RC circuit for protective purposes, thus requiring a larger number of components. Also, the voltage across such bridge circuit drops as the voltage across the control capacitor builds up from zero to the breakover voltage of the trigger diode of about 40 volts to reduce the control effect.

Since the voltage across the control capacitor never exceeds the trigger diode firing voltage of about 40 volts, it would appear reasonable to attempt to control with such bridge circuit parallel to the control capacitor. However, it has been found that this arrangement results in an unstable type of control system.

However, if two capacitors are used in series as in the aforementioned copending application, it has been discovered that use of a thermistor controlled bridge across the smaller capacitor provides the requisite sensitivity of control to afford speed control of an air conditioner fan or the like in response to a few degrees change in temperature or a small change in some other condition to be sensed.

An object of the invention is to provide a proportional control system of greater sensitivity to a variable condition for controlling energization of an electrical load device.

A more specific object of the invention is to provide a proportional control system of the aforementioned type which is adapted for reversing the output control effect in response to a given direction of input variation with only minor modification.

Another specific object of the invention is to provide a proportional control system of the aforementioned type which is adapted to facilitate the insertion of compensating devices in the system.

Other objects and advantages of the invention will hereinafter appear.

BRIEF DESCRIPTION OF THE DRAWINGS

The above and other objects and advantages of the invention and the manner of obtaining them will best be understood by reference to the following description of preferred embodiments of condition responsive proportional control systems taken in conjunction with the accompanying drawings wherein.

DESCRIPTION OF THE PREFERRED EMBODIMENTS

Figure 1:
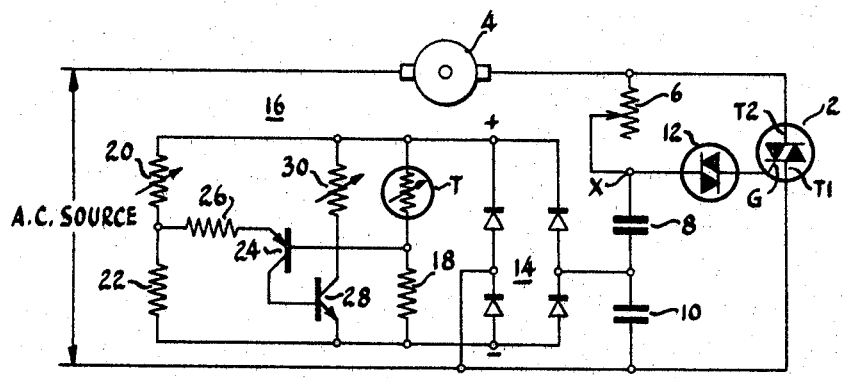
FIGURE 1 is a schematic circuit diagram of a condition responsive proportional control system constructed in accordance with the invention.

Referring to FIG. 1, there is shown a condition responsive proportional control system having a thermistor controlled bridge circuit and constructed and arranged so that it will decrease the energization of the load as the temperature drops. This will immediately be recognized as having application in air conditioner fan speed control and the like wherein the fan runs at top speed when the room temperature is high to cool off the room and wherein the fan slows down when the temperature falls to reduce the high cooling rate when no longer needed.

The system is provided with a bidirectional semiconductor power control element 2 such as a "Quadrac" for controlling power to a fan motor 4, the power control element and motor being connected in series across an AC supply. This system is provided with an adjustable resistor 6 and capacitors 8 and 10 connected in series in that order from terminal T2 to terminal T1 of the power control element, the junction X between resistor 6 and capacitor 8 being connected through a trigger diode 12 such as a "Trigger" or "Diac" to the gate G of "Quadric" 2.

The condition responsive bridge circuit that is connected across capacitor 10 comprises two bridges, a rectifier bridge 14 and a resistance bridge 16. The input terminals of rectifier bridge 14 are connected across capacitor 10 and the positive and negative output terminals thereof are connected across resistance bridge 16 so that the alternating voltage appearing on the capacitor is always applied in the same direction to the resistance (sensor) bridge.

This resistance bridge 16 comprises four branches including a sensor branch and a resistor branch having a thermistor T and a resistor 18, respectively, connected in series in that order from the positive output terminal of rectifier bridge 14 to the negative output terminal thereof. The other two branches of the resistance bridge include an adjustable resistor 20 and a fixed resistor 22, respectively, connected in that order from the positive output terminal of the rectifier bridge to the negative output terminal thereof. The output terminals of this resistance bridge, that is, the junction between resistors 20 and 22 and the junction between thermistor T and resistor 18 are connected to the emitter and base, respectively, of a PNP control transistor 24. A resistor 26 of predetermined value or an adjustable resistor may be connected in series in the emitter circuit of transistor 24 to set or adjust the gain. The collector of this control transistor is connected to the base of an NPN shunt transistor 28. This is a shunt transistor because the collector and emitter thereof are connected in series with an adjustable, minimum-speed resistor 30 in parallel with the input terminals of the resistance bridge, that is across the positive and negative output terminals of rectifier bridge 14.

The condition responsive bridge circuit that is connected across capacitor 10 operates to sense an ambient temperature condition and to control the speed of the fan motor as a proper function thereof. The fan speed will be controlled in the proper direction in response to temperature change as will hereinafter appear.

It will be apparent that in air conditioner (cooler) fan speed control, the fan will normally run at full speed but as the room temperature drops, the fan speed may be reduced to slow down the cooling effect. Due to a voltage on capacitor 10 in FIG. 1, current will flow through rectifier bridge 14 and from the positive output terminal of the latter in a first branch through thermistor T and resistor 18 and in a second branch through resistors 20 and 22. If this resistance bridge is in balance, there will be no voltage difference at its output terminals, that is, across the emitter and base of transistor 24. Consequently, transistors 24 and 28 will be turned off and a high resistance will appear across capacitor 10 so that minimum current will occur. As a result, gating type power control element 2 will fire early in each half-cycle of supply voltage and run the fan at full speed.

When the temperature drops, the fan speed will decrease. For this purpose, the decreasing temperature will increase the resistance of thermistor T to lower the voltage at the junction between the thermistor and resistor 18. Consequently, there will now be a positive emitter-to-base voltage which turns transistor 24 on causing current flow from the junction of resistors 20 and 22 through resistor 26 and the emitter and collector of transistor 24 and the base and emitter of transistor 28 to turn transistor 28 on. Current now flows from the positive output terminal of the rectifier bridge through resistor 30 and the collector and emitter of transistor 28 to the negative output terminal of the rectifier bridge. This current drains off some of the charge on capacitor 10 to retard the firing point of the power control element thereby to decrease the fan motor speed.

As the temperature decreases, transistor 28 is turned on more until minimum motor speed is attained. The minimum speed is set by adjusting resistor 30 so that the capacitor discharge current that can flow is limited to a certain maximum by the value of this resistor. As an example, the fan might have a full speed of 1400 r.p.m. and its minimum speed might be limited at 600 r.p.m. below which it might not be practical to run the fan due to overheating or lack of self cooling or proper bearing lubrication.

In the arrangement shown in FIG. 1, control transistor 24 is a PNP type and shunt transistor 28 is an NPN type. Also, the thermistor is connected in the upper right-hand branch of the resistance bridge whereby the voltage at the junction between the thermistor and resistor 18 is controlled in response to change in ambient temperature. This arrangement will afford a decrease in fan speed when the temperature drops.

It will be apparent that instead of lowering the voltage at the base of transistor 24 when the temperature drops, alternatively, the emitter voltage thereof might be raised with similar effect on motor speed. This immediately suggests that the thermistor could, alternatively, be connected in place of resistor 22 in the lower left-hand branch of the resistance bridge wherein it would raise the emitter voltage of transistor 24 when the temperature drops to decrease the motor speed likewise.

If the thermistor is connected in one of the other two branches of the resistance bridge, the polarity or direction of control effect will be reversed. That is, a decrease in ambinet temperature will cause a decrease in current drain from capacitor 10 and a consequent increase in power applied to the load. As will readily be apparent, that would be suitable for heater control whereby to increase heat generation when the temperature drops.

Figure 2:
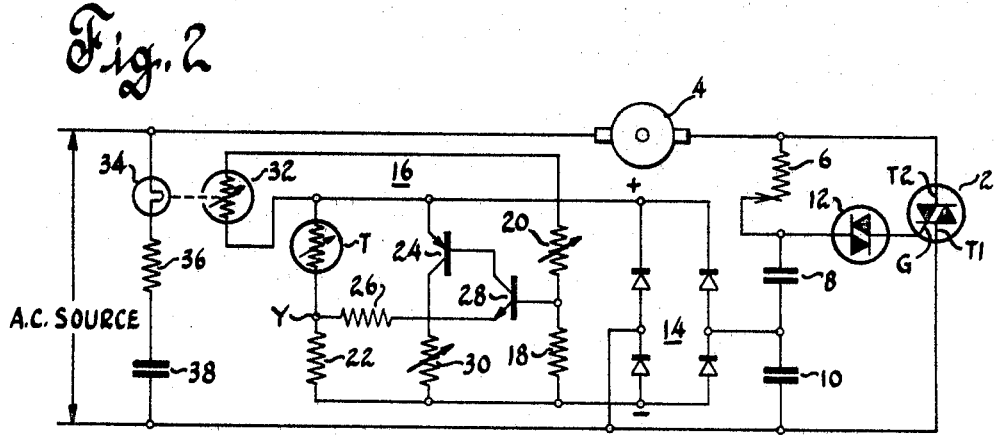
FIG. 2 is a schematic circuit diagram showing one possible modification of FIG. 1 including compensation for line voltage variation.

If the thermistor is connected in one of the aforementioned other two branches of the resistance bridge, that is, the upper left-hand or the lower right-hand branch, and the two transistors are also interchanged, the system will function without change in result, that is, in the same manner as the circuit in FIG. 1 functions. This alternative arrangement is shown in FIG. 2 along with compensation for line voltage variation. In FIG. 2, reference characters like those in FIG. 1 are used for like elements.

As shown in FIG. 2, thermistor T has been put in the upper left-hand branch of the resistance bridge. Adjustable resistor 20 has been put in the upper right-hand branch, while fixed resistor 22 has been left in the lower left-hand branch and fixed resistor 18 remains in the lower right-hand branch. By comparing the circuits in FIGS. 1 and 2, it will be apparent that after the thermistor has been placed in the desired branch of the resistance bridge, the adjustable resistor may be placed in any one of the other three branches when suitable values are selected for the two fixed resistors that complete the resistance bridge.

Also in FIG. 2, the transistors have been interchanged whereby NPN transistor 28 is now used as the control transistor and PNP transistor 24 is used as the shunt transistor. This is necessary if the polarity of the output is to remain unchanged because the relocation of the thermistor has reversed the direction in which the current flows between the output terminals of the resistance bridge in response to temperature drop. The base of control transistor 28 is connected to the junction between resistors 20 and 18 and the emitter thereof is connected through gain controlling resistor 26 to junction Y between thermistor T and resistor 22. The emitter of transistor 24 is connected to the positive output terminal of the rectifier bridge and the collector thereof is connected through minimum output adjusting resistor 30 to the negative output terminal of the rectifier bridge. The base of transistor 24 is connected to the collector of transistor 28.

When the temperature drops to increase the thermistor resistance, the voltage at junction Y decreases whereby transistor 28 is turned on more. This causes transistor 24 to be turned on more to shunt more current across the resistance bridge in a circuit extending through the emitter and collector of transistor 24 and resistor 30, the latter being adjustable to select the minimum energization of the load device. This increased drain of current from capacitor 10 causes retardation of the firing angle of power control element 2 to decrease the fan motor speed.

A compensation circuit is incorporated in an exemplary manner in the system of FIG. 2. As shown therein, photoresistor 32 is connected in series with resistor 20 in the upper righthand branch of the resistance bridge. It will be apparent that this photoresistor may be placed in series with, as shown, or in parallel with the bridge resistor depending upon the magnitude of the compensation that is desired and the relative value of the bridge parameters. Alternatively, this photoresistor may be connected in series or in parallel with resistor 18 or in some other branch of bridge 16. The line voltage variation signalling device in FIG. 2, that is, the circuit including lamp 34, resistor 36 and capacitor 38 in series is connected across the supply lines in the same manner as in the aforementioned copending application.

If the line voltage variably increases, lamp 34 brightens to decrease the resistance of photoresistor 32. This raises the voltage at the base of transistor 28 to turn the latter "on" more. Transistor 24 also turns on more to drain more current off capacitor 10 thereby to retard the firing angle of power control element 2. Since the increase in line voltage tended to increase the motor speed, this retardation of the firing angle reduces the motor energization duration tending to maintain its speed constant.

While FIG. 2 shows several changes from FIG. 1 and compensation added, it will be apparent that if only reversal of the output control is desired, it is preferable to have a balanced system and to interchange the positions of thermistor T and resistor 18 in FIG. 1. This would in effect change the system from cooling control to heating control while maintaining the total resistance in the right-hand upper and lower arms of the bridge the same. This will keep the thermistor in equivalent impedance arms of the bridge to equalize self heating of the thermistor.

As will be apparent, this resistance bridge controlled by a condition responsive device and having a transistorized output variably to drain current from capacitor 10 provides as sensitive a condition sensor as desired. It also facilitates reversing the control as from cooling to heating control by merely interchanging elements in the bridge. Moreover, it is readily adapted to various forms of compensation, one of which is shown in FIG. 2, by connecting the necessary compensator in the proper arm of the resistance bridge.

We claim:

1. In a proportional control system having an electrical supply circuit including means connecting power from an alternating current source to a load device, a power control circuit for controlling energization of the load device comprising:

a solid state gating type power control element and means connecting it in the supply circuit to the load device;

and a firing control circuit for said power control element comprising:

variable control means energized from said power control circuit and comprising resistance means and capacitance means in circuit connection;

a trigger element connected from a junction of said resistance means and said capacitance means to the gate of said power control element to control firing of the latter when the charge on said capacitance means reaches the breakover voltage of said trigger element on predetermined half-cycles of the applied voltage;

said capacitance means including two capacitors in series connection;

and variable current flow control means connected across one of said capacitors for controllably draining current therefrom to control the firing angle of said power control element by controlling the time point on the half-cycle of applied voltage at which said breakover voltage is reached, said variable current flow control means comprising:

a resistance bridge circuit;

means connecting said resistance bridge circuit at its input terminals across said one capacitor;

a controllable shunt circuit connected in parallel with said resistance bridge circuit;

a condition responsive variable resistance device in said resistance bridge circuit for unbalancing said bridge circuit in response to variation in an external condition;

and means connected across the output terminals of said resistance bridge circuit for controlling current flow in said shunt circuit in proportion to unbalancing of said resistance bridge circuit.

2. The invention defined in claim 1, wherein said means connecting said resistance bridge circuit at its input terminals across said one capacitor comprises:

a rectifier bridge having its input terminals connected across said one capacitor and having its positive and negative output terminals connected across the input terminals of said resistance bridge circuit.

3. The invention defined in claim 1, together with:

means compensating for line voltage variations comprising;

means connected to a branch of said resistance bridge and adapted to respond to said line voltage variations to produce a contrary variation thereby tending to eliminate the effect of the same.

4. The invention defined in claim 1 together with:

means compensating for supply voltage variations comprising:

means including a low voltage lamp and impedance means connected to the A.C. supply whereby said lamp varies in brightness in proportion to supply voltage variations;

and a photoresistor connected in one branch of said resistance bridge circuit to retard said firing angle when the supply voltage increases, and vice versa, in response to the light from said lamp.

5. The invention defined in claim 1, together with:

means comprising a lamp supplied from said source to vary in brightness in proportion to any variation in supply voltage;

and said variable current flow control means comprises a photoresistor which responds to the variation of light from said lamp to retard said firing angle when the supply voltage increases, and vice versa, thereby to compensate for supply voltage variations.

6. The invention defined in claim 1, wherein said means connected across the output terminals of said resistance bridge circuit for controlling current flow in said shunt circuit in proportion to unbalancing of said resistance bridge circuit comprises:

a first transistor for controlling current flow in said shunt circuit;

and a second transistor responsive to unbalancing of said resistance bridge circuit for controlling said first transistor.

7. The invention defined in claim 6, wherein said controllable shunt circuit comprises:

an adjustable resistor settable to limit the current that can be drained from said one capacitor thereby to set a low limit to energization of the load device.

8. The invention defined in claim 1, wherein:

one of said two capacitors is substantially smaller in capacitance value than the other capacitor;

and said variable current flow control means is connected across said smaller capacitor.

References Cited

UNITED STATES PATENTS

| | | |
|---|---|---|
| 3,242,346 | 3/1966 | Skoubo. |
| 3,244,964 | 4/1966 | Greening et al. |
| 3,344,311 | 9/1967 | Nuckolls. |
| 3,368,140 | 2/1968 | Tobey. |

JOHN F. COUCH, Primary Examiner

A. D. PELLINEN, Assistant Examiner

U.S. Cl. X.R.

307—310; 318—345, 471; 323—22, 24, 37